United States Patent
Nakamura

(10) Patent No.: US 7,868,917 B2
(45) Date of Patent: Jan. 11, 2011

(54) IMAGING DEVICE WITH MOVING OBJECT PREDICTION NOTIFICATION

(75) Inventor: Mitsumi Nakamura, Asaka (JP)

(73) Assignee: Fujifilm Corporation, Tokyo (JP)

( * ) Notice: Subject to any disclaimer, the term of this patent is extended or adjusted under 35 U.S.C. 154(b) by 939 days.

(21) Appl. No.: 11/600,173

(22) Filed: Nov. 16, 2006

(65) Prior Publication Data
US 2007/0115363 A1    May 24, 2007

(30) Foreign Application Priority Data
Nov. 18, 2005  (JP)  ............... 2005-334658

(51) Int. Cl.
H04N 5/228  (2006.01)
(52) U.S. Cl. ............ 348/208.14; 348/345; 348/155
(58) Field of Classification Search ........ 348/333.02, 348/333.03, 169–172, 340, 345–356, 143, 348/552, 333.04; 396/124, 89, 82, 79; 352/140; 358/906
See application file for complete search history.

(56) References Cited

U.S. PATENT DOCUMENTS

| | | | | |
|---|---|---|---|---|
| 5,266,985 | A * | 11/1993 | Takagi | 396/147 |
| 6,359,650 | B1 * | 3/2002 | Murakami | 348/333.04 |
| 7,057,643 | B2 * | 6/2006 | Iida et al. | 348/208.14 |
| 7,613,324 | B2 * | 11/2009 | Venetianer et al. | 382/103 |
| 2002/0140814 | A1 * | 10/2002 | Cohen-Solal et al. | 348/172 |
| 2003/0071908 | A1 * | 4/2003 | Sannoh et al. | 348/345 |
| 2003/0103149 | A1 * | 6/2003 | Kinjo et al. | 348/231.5 |
| 2005/0013601 | A1 * | 1/2005 | Ide et al. | 396/121 |

FOREIGN PATENT DOCUMENTS

| | | |
|---|---|---|
| GB | 2343945 A | 5/2000 |
| JP | 2000-163600 A | 6/2000 |
| JP | 2000-333045 | 11/2000 |
| JP | 2001-285850 A | 10/2001 |
| JP | 2003-199032 | 7/2003 |
| JP | 2004-112550 A | 4/2004 |
| JP | 2004-320287 | 11/2004 |
| JP | 2005-217768 | 8/2005 |
| JP | 2005-269153 A | 9/2005 |
| JP | 2005-269562 A | 9/2005 |
| JP | 2005269562 A * | 9/2005 |
| KR | 102000003505 A | 6/2000 |
| KR | 1020010002097 A | 1/2001 |

* cited by examiner

*Primary Examiner*—Nelson D. Hernández Hernández
(74) *Attorney, Agent, or Firm*—Birch, Stewart, Kolasch & Birch, LLP

(57) ABSTRACT

The present invention provides an imaging device comprising: an image pickup device which picks up an object, an image acquisition device which continuously acquires image signals indicating the object via the image pickup device, a face recognition device which continuously recognizes the face of the object at predetermined time intervals from the continuously acquired image signals, a tracking indication device which indicates to keep track of the face of the object, a prediction device which predicts the position of the face of the object after a predetermined time elapsed since the tracking indication device indicated tracking based on a plurality of pieces of information about the position of the continuously recognized face of the object and the time intervals of recognizing the face, and a notification device which notifies a user of the predicted position of the face of the object.

10 Claims, 5 Drawing Sheets

IMAGING DEVICE WITH MOVING OBJECT PREDICTION NOTIFICATION

BACKGROUND OF THE INVENTION

1. Field of the Invention

The present invention relates to an imaging device, and in particular a shooting device that assists in causing a moving person to be within a shooting range.

2. Description of the Related Art

Japanese Patent Application Laid-Open No. 2004-112550 describes specifying an object of interest within a field of view by an object specification device, tracking the specified object region, indicating the position of the object region with a pointer, and if tracking the object region is failed such as where the object region is moved outside a screen, displaying an indicator warning of it.

Japanese Patent Application Laid-Open No. 2000-163600 describes recognizing the face of a person and operating controlling pan/tilt or zoom controls for moving a camera position in the horizontal/vertical directions or forward/backward directions to track the face of the person.

If a person to be shot is moving, it is required to move camera according to the movement of the person of interest such that the person is within a shooting range and is also required to operate a zoom key to determine the angle of view depending on a movement direction of the person of interest, and therefore framing has been laborious work.

To resolve this, Although Japanese Patent Application Laid-Open No. 2004-112550 suggests an imaging device which tracks an object region specified by an object specification device, this imaging device is intended to track the specified object region and therefore has a problem that it does not directly track the person to be shot.

Although Japanese Patent Application Laid-Open No. 2000-163600 suggests a shooting method of recognizing the face of a person and operating pan/tilt or zoom controls of a camera to track the recognized face of the person, the shooting method requires the camera to be mounted on a pan/tilt or zoom driving device (motor pan head) and can not be applied to typical portable cameras.

In view of foregoing, it is an object of the present invention to provide an imaging device that can assist to facilitate framing when a user shoots a particular person while following the person and can improve usability for a user.

SUMMARY OF THE INVENTION

An imaging device according to a first aspect for achieving the above object comprises an image pickup device which picks up an object, an image acquisition device which acquires an image signal indicating the object via the image pickup device, a face recognition device which recognizes a face of the object from the acquired image signal, and a notification device which provides a notification of the direction of movement of the imaging device such that the recognized face of the object is within the shooting range.

When a user shoots a particular person while following the person, the imaging device automatically recognizes the face of the person, and if the face of the person is about to depart from the shooting range or if the face has departed from the shooting range, the imaging device provides a notification of the direction of movement of the imaging device such that the face is within the shooting range. This notification enables the user to immediately determine the direction of movement of the imaging device and to place the face of the person within the shooting range without the need to recognize the position of the face of the object.

As described in a second aspect, in the imaging device according to the first aspect, if a part of the recognized face of the object is external to the shooting range, the notification device provides the notification of the direction of movement of the imaging device such that the face of the object is within the shooting range.

As described in a third aspect, in the imaging device according to the second aspect, if a part of the recognized face of the object is external to a predetermined frame defined within the shooting range, the notification device provides the notification of the direction of movement of the imaging device such that the face of the object is within the frame.

As described in a fourth aspect, in the imaging device according to the third aspect, the notification device provides different notifications depending on whether the part of the recognized face of the object is external to the frame or external to the shooting range.

As described in a fifth aspect, the imaging device according to any of the first to fourth aspects further comprises a monitor which displays a through movie based on the acquired image signal, and the notification device displays the direction of movement of the imaging device on the monitor.

For example, the notification device displays a mark indicating the direction of movement of the imaging device on the monitor. If a part of the face of the object is external to the frame, the notification device causes the mark to turn on, if a part of the face of the object is external to the shooting range, the notification device flashes and/or enlarges the mark to provide different notifications.

An imaging device according to a sixth aspect comprises an image pickup device which picks up an object, an image acquisition device which continuously acquires image signals indicating the object via the image pickup device, a face recognition device which continuously recognizes the face of the object at predetermined time intervals from the continuously acquired image signals, a tracking indication device which indicates to keep track of the face of the object, a prediction device which predicts the position of the face of the object after a predetermined time elapsed since the tracking indication device indicated tracking based on a plurality of pieces of information about the position of the continuously recognized face of the object and the time intervals of recognizing the face, and a notification device which notifies a user of the predicted position of the face of the object.

In the case where a shutter button is pressed when the face of a moving person reaches a desired position within the shooting range, when the tracking indication device provides a tracking indication input, the position of the face of the object after a predetermined time elapsed since the input is provided is predicted and the user is notified of the predicted position of the face of the object.

This enables the user to know the position of the face of the object at the predetermined time and to move the imaging device and press the shutter button such that the face of the object is positioned at the desired position within the shooting range.

As described in a seventh aspect, the imaging device according to the sixth aspect further comprises a monitor which displays a through movie based on the acquired image signal, and the notification device displays a mark at the predicted position of the face of the object.

As described in an eighth aspect, in the imaging device according to the sixth or seventh aspect, the notification device notifies a user of the predicted position of the face of the object during a certain period after a prediction indication is inputted from the tracking indication device.

As described in a ninth aspect, the imaging device according to the first to sixth aspects further comprises an object specification device which specifies the position of the object, and when the object recognition device recognizes the face of the object at the specified position of the object, the object recognition device regards the face of the object as an object to be recognized.

As described in a tenth aspect, in the imaging device according to the first to sixth aspects, when the face recognition device recognizes a face similar to the face of the object which has been previously registered from the acquired image signal, the face recognition device regards the similar face as an object to be recognized.

According to the present invention, an imaging device is configured to automatically recognize the face of a particular person when a user shoots the person while following the person, to provide a notification of the direction of movement of the imaging device such that the face of the person is within the shooting range and to provide a notification of the predicted position of the face of the object at a predetermined time, and therefore improves usability for the user.

DETAILED DESCRIPTION OF THE PREFERRED EMBODIMENTS

An imaging device according to the present invention will now be described with reference to the accompanying drawings.

[Imaging Device Configuration]

Figure 1:
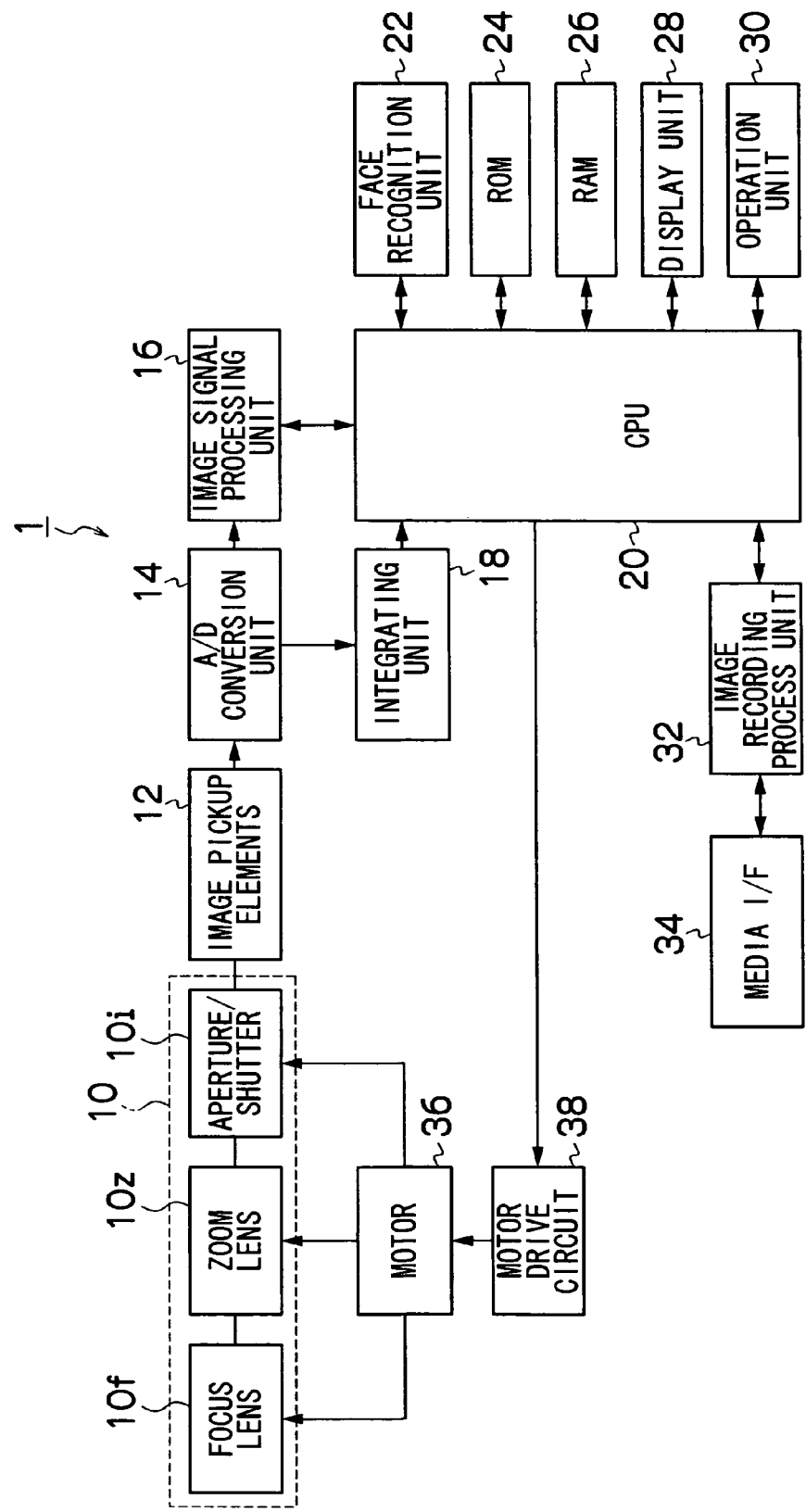
FIG. 1 is a block diagram showing an embodiment of an imaging device according to the present invention.

FIG. 1 is a block diagram showing an embodiment of an imaging device according to the present invention.

The imaging device 1 shown in FIG. 1 is a digital camera having functions for recording and playing back a still picture and a movie. This imaging device 1 includes a shooting optical system 10, image pickup elements 12 such as image pickup elements, an A/D conversion unit 14, an image signal processing unit 16, an integrating unit 18, a central processing unit (CPU) 20, a face recognition unit 22, ROM (Read Only Memory) 24, RAM (Random Access Memory) 26, a display unit 28 such as a liquid crystal monitor, an operation unit 30, an image recording process unit 32, a media interface 34 and the like.

The CPU 20 controls the entire operation of the image device 1 and controls each unit of the image device 1 according to predetermined programs based on an input from the operation unit 30.

The ROM 24 stores programs executed by the CPU 20 as well as data required for various controls such as a program chart. The CPU 20 expands the programs stored in the ROM 24 into the RAM 26 and executes various processing using the RAM 26 as a working memory.

The shooting optical system 10 includes a focus lens 10f, zoom lens 10z and aperture/shutter 10i, which are driven and controlled by instructions from the CPU 20 via a motor drive circuit 38 and a motor 36.

The image pickup elements 12 are constituted by color image pickup elements arranged in a predetermined color filter array (e.g., G stripe R/G complete mosaic, Bayer arrangement). Light incident on a light receiving surface of the image pickup elements 12 is converted to an amount of signal charges corresponding to the amount of the incident light by photodiodes arranged on the light receiving surface via the shooting optical system 10. The signal charges stored in each photodiode is read out according to a timing signal applied from a timing generator, not shown, and sequentially outputted from the image pickup elements 12 as voltage signals (image signal).

The image pickup elements 12 comprises a shutter gate and a shutter drain can output the signal charges stored in each photodiode to the shutter drain by applying a shutter gate pulse to the shutter gate. The CPU 20 controls a charge storage period (shutter speed) of signal charges stored in each photodiode by controlling application of the shutter gate pulse to the shutter gate via the timing generator (so-called electronic shutter function).

The A/D conversion unit 14 converts analog a RGB image signals read from the image pickup elements 12 to a digital image signal. R, G and B signals converted to the digital signal by the A/D conversion unit 14 is applied to the image signal processing unit 16 and the integrating unit 18.

For each of plurality of divided areas into which a screen is divided (8×8), the integrating unit 18 determines an average integrated value for each of R, G and B image signals. The average integrated values for R, G and B image signals for each of these divided areas are provided to the CPU 20.

Based on the average integrated values for R, G, B colors for each divided areas provided from the integrated unit 18, the CPU 20 calculates a white balance correction value (gain value) for each of R, G, and B colors provided to the image signal processing unit 16. The CPU 20 also detects the brightness of the object based on the integrated average values, the aperture on acquiring the image signals and shutter speed, determines EV value, specifies exposure on picking up the image based on the EV value and controls the aperture of the shooting optical system 10, the shutter 10i and the electronic shutter of the image pickup elements 12.

The image signal processing unit 16 includes a linear matrix circuit, a white balance correction circuit, a gamma correction circuit, a synchronization circuit, a brightness/color difference signal generating circuit, a color difference matrix circuit and the like and processes image signals according to the instruction from the CPU 20 and generates YC signals consisting of a brightness signal Y and color difference signals Cr, Cb.

The face recognition unit 22 detects the face, nose, lips and the like of the object from a picked-up image or a recorded image and identifies features and patterns of them to recognize the face of the object. A particular method of face detection and recognition may be a known method such as a face detection method of detecting edges and shape patterns, a face detection method of extracting hue or flesh color.

If a movie (through movie) is displayed on the display unit 28, images of the object is continuously picked up by the image pickup elements 12 and the resulting image signals is continuously processed to generate YC signals. The generated YC signals is converted to a signal format for display and outputted to the display unit 28. As a result, the through movie is displayed on the display unit 28.

With reference to the through movie displayed on the display unit 28, the user performs framing, confirms the object to be shot, confirms the shot image, and specifies shooting conditions. The display unit 28 also displays an indication assisting the framing and will be described in detail below.

The operation unit 30 includes a mode lever for selecting a shooting mode (auto shooting mode, manual shooting mode, scene position, movie, etc.), a shutter button, a multifunction 4-direction key, zoom button, a playback button for switching to playback mode, a menu button for displaying a menu screen, an OK button for selecting a desired item in the menu screen to indicate determination of the selected item and execution of the processing, a cancel button for canceling to delete a desired object such as the selected item, or canceling the indication, or returning to a previous state, and a tracking button according to the present invention.

An output signal from the operation unit 30 is inputted to the CPU 20, which performs an appropriate processing such as shooting or playback based on the input signal from the operation unit 30 while performing a processing for tracking the object to assist the framing or the like.

If an image is recorded, the image pickup elements 12 picks up the image according to an instruction from the operation unit 30 and the resulting image signal is processed to generate a YC signal. After the generated YC signal is compressed into a predetermined compression image data (e.g., JPEG format), it is recorded in a recording medium (e.g., xD picture card, etc.) via a media interface 34.

Next, processes where the imaging device 1 tracks the face of a moving object to shoot the object will be described.

First Embodiment

Figure 2:
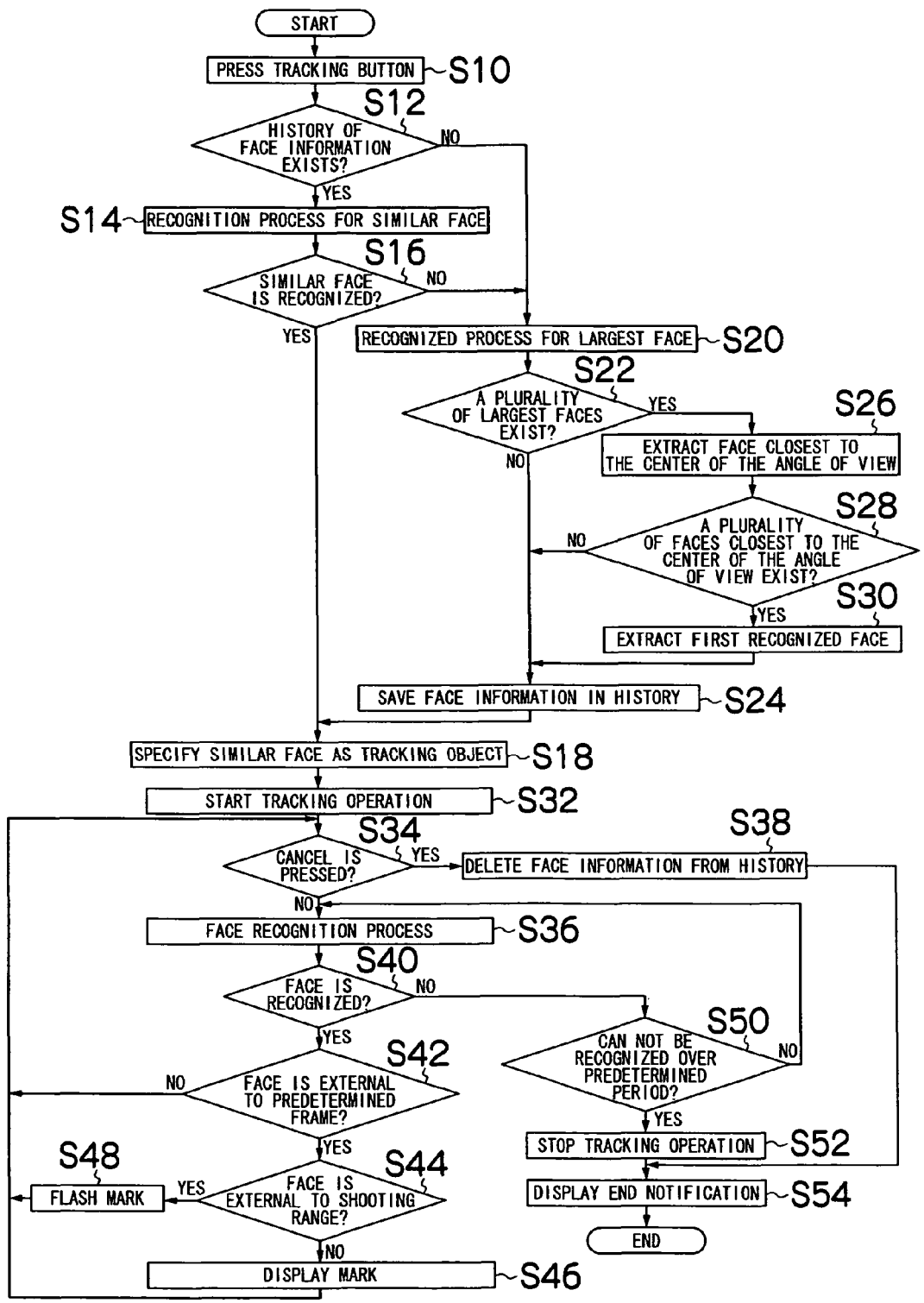
FIG. 2 is a flow chart showing a first embodiment where the face of an object is tracked to shoot the object.

FIG. 2 is a flow chart showing a first embodiment where the face of an object is tracked to shoot the object.

In FIG. 2, when the tracking button on the operation unit 30 is pressed during shooting mode (step S10), the CPU 20 determines whether or not a history of previously tracked face information exists (step S12). If the history of the face information exists, a process for recognizing a face having face information similar to the above face information in image data of a through movie is performed (step S14).

Then it is determined whether or not a similar face is recognized in the face recognition-process (step S16). If a similar face has been recognized, the face is specified as a tracking object (step S18).

On the other hand, if the history of the face information does not exist, or the history of the face information exists but a face similar to that face is not recognized, a recognition process for extracting the largest face in an image in the through movie (step S20). It is determined whether or not a plurality of largest faces exist (step S22), and if one largest face exists, the face information of the face is saved in the history and the history of the face information is updated (step S24). If a plurality of largest faces exists, the face closest to the center of the angle of view is extracted (step S26) and it is determined whether or not a plurality of faces closest to the center of the angle of view exist (step S28).

If one face closest to the center of the angle of view exists, the face information of the face is saved in the history and the history of the face information is updated (step S24). On the other hand, a plurality of faces closest to the center of the angle of view exist, the first recognized face is extracted (step S30) and the face information of the face is saved in the history and the history of the face information is updated (step S24).

After the face to be tracked is specified, the CPU 20 starts a tracking operation (step S32). After starting the tracking, the CPU 20 determines whether or not the cancel button is pressed (step S34), and if it is not pressed, the CPU 20 performs a recognition process for the face to be tracked at a predetermined period (e.g., 0.5 seconds) (step S36).

On the other hand, if the cancel button is pressed, the face information is deleted from the history (step S38) and the end of the tracking is displayed on the display unit 28 (step S54). This enables the face to be tracked to be changed.

From the result of the face recognition process at step S36, it is determined whether or not the face to be tracked is recognized (step S40), and if the face is recognized, it is determined whether or not the recognized face (or a part of it) is external to a predetermined frame F which is smaller than the shooting range (shown by broke lines in FIGS. 3A to 3C) (step S42).

Figure 3A:
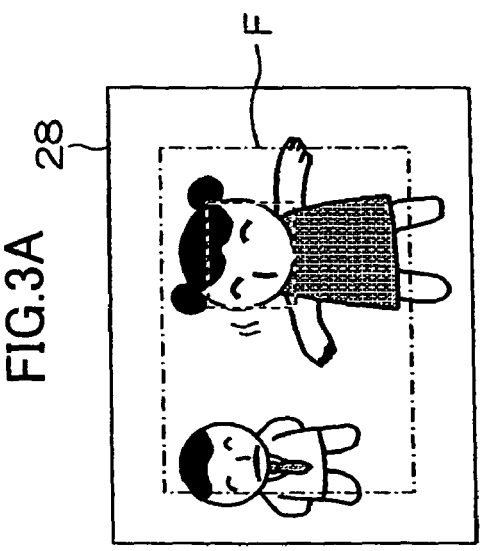
FIGS. 3A to 3C show examples of a monitor screen of a display unit which displays a through movie during the tracking operation according to the first embodiment.
Figure 3C:
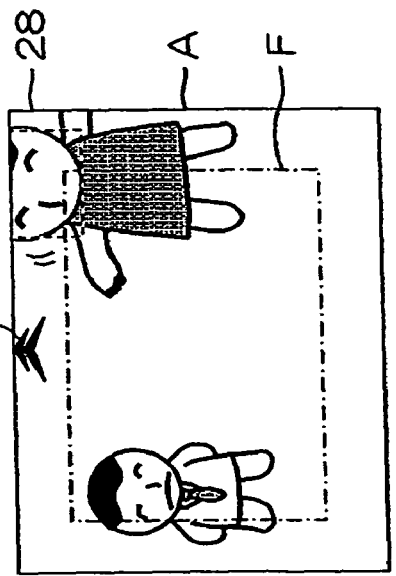
Figure 3B:
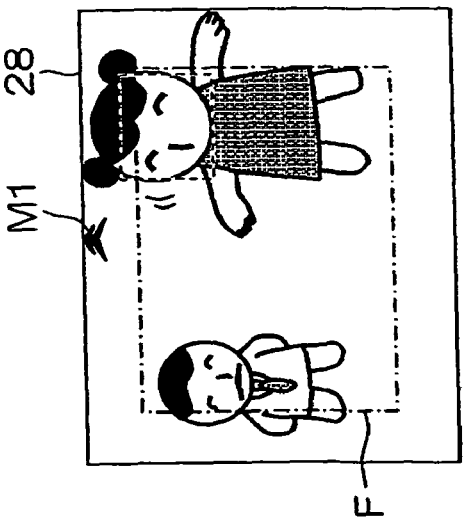

FIGS. 3A to 3C show examples of the monitor screen of the display unit 28 which displays a through movie during the tracking operation according to the first embodiment. FIG. 3A shows a state where the imaging device 1 appropriately tracks a face (of a girl) to be tracked. FIG. 3B shows a state where a part of the face is external to the frame F. FIG. 3C shows a state where a part of the face is external to the shooting range. The frame of dotted lines around the face of the girl shows the face region recognized by the imaging device 1. The frame F is not displayed on the actual screen of the display unit 28.

At step S42, if it is determined that the face (or a part of the face) is not external to the predetermined frame F, the process proceeds to step S34 and the tracking operation is repeated. At this point, as shown in FIG. 3A, only a normal through movie is displayed on the screen of the display unit 28.

On the other hand, if it is determined that the face (or a part of the face) is external to the predetermined frame F, it is further determined whether or not the face (or a part of the face) is external to the shooting range (step S44).

If the face (or a part of the face) is external to the predetermined frame F and is not external to the shooting range, as shown in FIG. 3B, a mark M1 indicating the direction of movement of the imaging device 1 such that the face is within the frame F is turned on the screen of the display unit 28 (step S46), or if it is determined that the face (or a part of the face) is external to the shooting range, as shown in FIG. 3C, a mark M2 (which is larger than the mark M1) indicating the direction of movement of the imaging device 1 such that the face is within the shooting range is flashed on the screen of the display unit 28 (step S48).

In FIG. 3B, since a part of the face of the object to be tracked is external to the upper side of the frame F, the mark M1 is displayed at the upper edge of the screen of the display unit 28 in order to move up the imaging device 1. In FIG. 3C, since a part of the face of the object to be tracked is external to the upper side of the shooting range, the mark M2 is flashed at the upper edge of the screen of the display unit 28 in order to move up the imaging device 1.

When the user moves the imaging device 1 according to the above marks M1, M2 and the face of the object is within the shooting range, the mark M2 is changed to the mark M1, and when the face of the object is within the frame F, the mark M1 disappears from the screen of the display unit 28 (see FIG. 3A).

At step S40, if the face to be tracked can not be recognized, it is determined whether or not the face can not be recognized over a predetermined period (step S50), and if the face is recognized within the predetermined period, the process returns to step S36, otherwise, if the face can not be recognized over the predetermined period, the tracking operation is stopped (step S52) and then the process proceeds to step S54.

As a result, even when a user is shooting the face of a moving person and failed to track the face, the user can frame the face to be tracked such that the face is within the frame F by changing the direction of movement (orientation) of the imaging device 1 with reference to the marks M1, M2 on the display unit 28.

The marks M1, M2 are not limited to those of the present embodiment and, for example, may be the same size and only different in that the display schemes are turn-on and flashing or different display colors are used.

Second Embodiment

Figure 4:
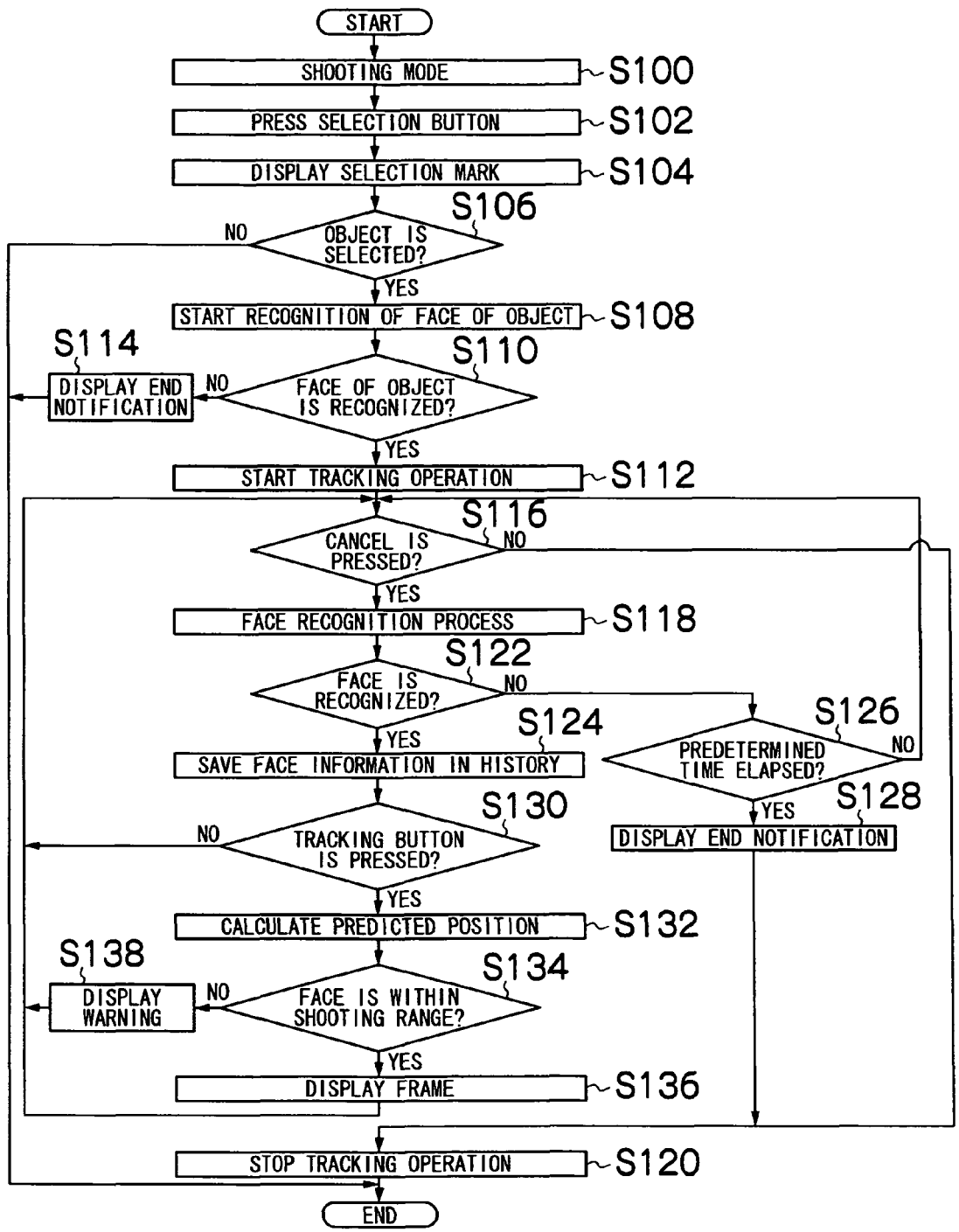
FIG. 4 is a flow chart showing a second embodiment where the face of an object is tracked to shoot the object.

FIG. 4 is a flow chart showing a second embodiment where the face of an object is tracked to shoot the object.

In FIG. 4, during the shooting mode is specified, when a selection button for selecting a object to be tracked is pressed (step S100, S102), the CPU 20 causes a selection mark to be displayed at the center of the screen of the display unit 28 (step S104).

Then, it is determined whether or not the object to be tracked is selected (step S106). The user can select the object to be tracked by operating the 4-direction key to move the selection mark to the position of the face of the object to be tracked on the screen of the display unit 28 and pressing the tracked button.

When the user performs the object selection operation, the CPU 20 causes face recognition of the object to be started via the face recognition unit 22 (step S108). In this face recognition, a face image closest to the selection mark is extracted from the image data and the extracted face image is recognized as the face to be tracked.

When the face of the object is recognized, the CPU 20 starts the tracking operation (step S112). On the other hand, if the face of the object can not be recognized, the display unit 28 displays the end of tracking and the process ends (step S114).

After tracking of the object is started, the CPU 20 determines whether or not the cancel button is pressed (step S116), and if it is not pressed, the CPU 20 performs a recognition process for the face to be tracked at a predetermined periods (e.g., 0.5 seconds) (step S118). On the other hand, if the cancel button is pressed, the tracked operation ends (step S120).

Figure 5A:
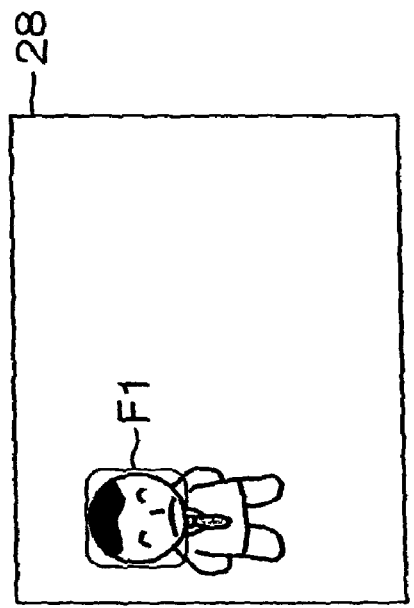
FIGS. 5A to 5C show examples of a monitor screen of a display unit which displays a through movie during the tracking operation in the second embodiment.
Figure 5C:
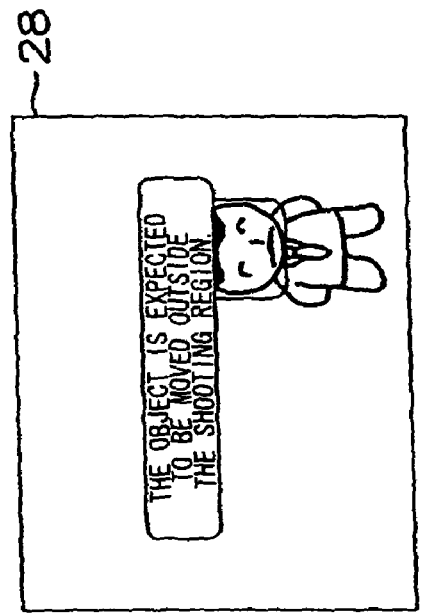
Figure 5B:
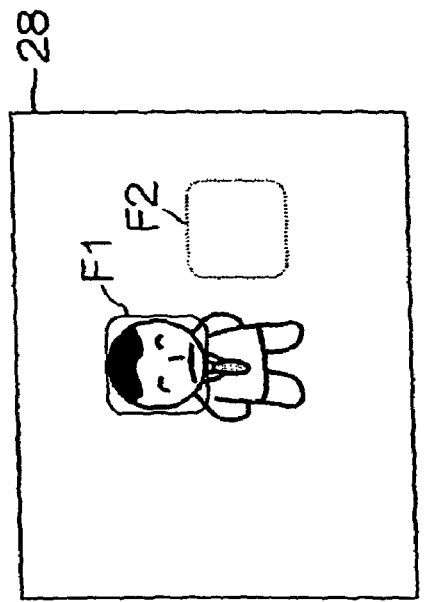

FIGS. 5A to 5C show examples of a monitor screen of the display unit 28 which displays a through movie during the tracking operation in the second embodiment, FIG. 5A shows a monitor screen during tracking, FIG. 5B shows a monitor screen displaying a prediction result, and FIG. 5C shows a monitor screen displaying a warning.

From the result of the face recognition process at step S118, it is determined that whether or not the face to be tracked is recognized (step S122), and if the face is recognized, information about the recognized face (position and size) is save as a history (step S124). In this embodiment, up to 64 pieces of latest face information are saved as the history.

As shown in FIG. 5A, a frame F1 shown by solid lines is displayed around the tracking face and notifies a user of the tracking object.

At step S122, if the face to be tracked is recognized, it is determined whether or not the face can not be recognized over a predetermined period (step S126), and if the face is recognized within the predetermined period, the process returns to step S116, otherwise, if the face can not be recognized over the predetermined period, the end of the tracking is displayed on the displayed unit 28 (step S128) and then the process proceeds to step S120.

During tracking the face of the object, it is determined whether or not the user pressed the tracking button (step S130), and the CPU 20 calculates the predicted position and size of the face of the object after a time period (e.g., 5 seconds) previously specified based on the history of the face information save at step 124 (step S132). The predicted position and size can be calculated by performing linear prediction of the face information (position and size) after the predetermined time period based on the history of the face information (position and size) collected at a predetermined period.

From the above predicted face position and size, it is determined whether or not the face is within the shooting range (step S134), and if the face is within the shooting range, a frame F2 indicating the position of the face after the predetermined time period is displayed for 2 seconds after the tracking button is pressed as shown in FIG. 5B (step S136).

On the other hand, if the face is not within the shooting range, the display unit 28 displays a warning of it as shown in FIG. 5C and process proceeds to step S116 (step S138).

Therefore, when shooting the face of a moving person, the user can press the tracking button at any timing to recognize the position and size of the face of the object after a predetermined time elapsed since that time by the frame F2 (see FIG. 5B), and press the shutter button when the face of the object reaches the position.

If the predicted face of the object is not within the shooting range, or the position and the size of the face are not desirable for the user, after adjusting framing, the tracking button can be again pressed and frame can be adjusted such that the desired position and size are predicted.

In the present embodiment, although the position of the face of the object after the predetermined time (5 seconds) elapsed since the tracking button is pressed is predicted, the predetermined time is not limited to 5 seconds and the user may select it from the menu screen such as 3, 5, and 10 seconds or specify arbitrary time.

Alternatively, after the tracking button is pressed, the shutter may be automatically pressed after the predetermined time elapsed if the cancel button is not pressed.

What is claimed is:
1. An imaging device comprising:
an image pickup device which picks up an object,
an image acquisition device which continuously acquires image signals indicating the object via the image pickup device,
a monitor which displays a through movie based on the acquired image signal,
a face recognition device which continuously recognizes the face of the object at predetermined time intervals from the continuously acquired image signals,
a tracking indication device which indicates to keep track of the face of the object,
a prediction device which predicts the position of the face of the object after a user defined predetermined time elapsed since the tracking indication device indicated tracking based on a plurality of pieces of information about the position of the continuously recognized face of the object and the time intervals of recognizing the face,
a notification device which notifies a user of the predicted position of the face of the object, the notification being displayed on the monitor before capturing a still image, a cancel indication device which cancels the indication of tracking by the tracking indication device, and a shutter control device which automatically releases the shutter to capture the still image after the predetermined time elapsed, in the case where the tracking indication is not canceled by the cancel indication device by the predetermined time elapsed since the tracking indication device indicated tracking.

2. The imaging device according to claim 1, wherein the notification device displays a mark at the predicted position of the face of the object.

3. The imaging device according to claim 2, wherein the notification device notifies a user of the predicted position of the face of the object during a certain period after a prediction indication is inputted from the tracking indication device.

4. The imaging device according to claim 1, wherein the notification device notifies a user of the predicted position of the face of the object during a certain period after a prediction indication is inputted from the tracking indication device.

5. The imaging device according to claim 1, further comprising an object specification device which specifies the position of the object, wherein when the object recognition device recognizes the face of the object at the specified position of the object, the object recognition device regards the face of the object as an object to be recognized.

6. The imaging device according to claim 1, wherein when the face recognition device recognizes a face similar to the face of the object which has been previously registered from the acquired image signal, the face recognition device regards the similar face as an object to be recognized.

7. The imaging device according to claim 1, wherein the predetermined time is in a range of 3 seconds to 10 seconds.

8. The imaging device according to claim 1, wherein the prediction device predicts the size of the face of the object after a predetermined time elapsed since the tracking indication device indicated tracking based on the sizes of a plurality of the continuously recognized face of the object and the time intervals of recognizing the face.

9. The imaging device according to claim 1, wherein the notification device warns when the position of the face of the object predicted by the prediction device is out of the shooting range.

10. The imaging device according to claim 1, wherein the notification device notifies the position of the face only when the position of the face of the object predicted by the prediction device is within the shooting range.

* * * * *